US012769396B2

(12) United States Patent
Hao et al.

(10) Patent No.: US 12,769,396 B2
(45) Date of Patent: Oct. 20, 2026

(54) OPTICAL BRAIN-COMPUTER INTERFACE SYSTEM AND METHOD

(71) Applicants: Institute of Automation, Chinese Academy of Sciences, Beijing (CN); Institute of Neuroscience, Chinese Academy of Science Center for Excellence In Brain Science and Intelligence Technology, Shanghai (CN); Guangdong Institute of Artificial Intelligence and Advanced Computing, Guangdong (CN)

(72) Inventors: Jie Hao, Beijing (CN); Jiulin Du, Shanghai (CN); Chunfeng Shang, Shanghai (CN); Meiting Zhao, Beijing (CN); Qiuxiang Fan, Beijing (CN); Zhifeng Lv, Beijing (CN); Yu Mu, Shanghai (CN); Yufan Wang, Shanghai (CN)

(73) Assignees: Institute of Automation, Chinese Academy of Sciences, Beijing (CN); Institute of Neuroscience, Chinese Academy of Science Center for Excellence in Brain Science and Intelligence Technology, Chinese Academy of Science, Shanghai (CN); Guangdong Institute of Artificial Intelligence and Advanced Computing, Guangdong (CN)

( * ) Notice: Subject to any disclaimer, the term of this patent is extended or adjusted under 35 U.S.C. 154(b) by 0 days.

(21) Appl. No.: 19/157,177

(22) PCT Filed: Mar. 28, 2023

(86) PCT No.: PCT/CN2023/084459

§ 371 (c)(1),
(2) Date: Aug. 15, 2025

(87) PCT Pub. No.: WO2024/168994

PCT Pub. Date: Aug. 22, 2024

(65) Prior Publication Data

US 2026/0244270 A1 Aug. 20, 2026

(30) Foreign Application Priority Data

Feb. 17, 2023 (CN) ........................ 202310131178.9

(51) Int. Cl.
*G06F 3/01* (2006.01)
*G06T 7/30* (2017.01)

(52) U.S. Cl.
CPC ................ *G06F 3/015* (2013.01); *G06T 7/30* (2017.01)

(58) Field of Classification Search
None
See application file for complete search history.

(56) References Cited

U.S. PATENT DOCUMENTS

| | | | |
|---|---|---|---|
| 5,853,370 | A | 12/1998 | Chance et al. |
| 2009/0292210 | A1 | 11/2009 | Culver et al. |

(Continued)

FOREIGN PATENT DOCUMENTS

| | | | |
|---|---|---|---|
| CN | 101600973 | A | 12/2009 |
| CN | 103040446 | A | 4/2013 |

(Continued)

OTHER PUBLICATIONS

Chinese Search Report for Application No. 2023101311789 dated Feb. 17, 2023, 5 pages.

(Continued)

*Primary Examiner* — Christopher J Kohlman
(74) *Attorney, Agent, or Firm* — TraskBritt

(57) ABSTRACT

An optical brain-computer interface system includes an acquisition unit, a preprocessing unit, a registration unit, a decoding unit, and a feedback unit. The acquisition obtains an optical neural signal from an optical acquisition device based on a preset interface. The preprocessing unit preprocesses the optical neural signal to obtain first neural image data, wherein the first neural image data comprises at least one layer of image data. The registration unit performs parallel registration on the first neural image data based on a preset first registration algorithm and a preset second registration algorithm to obtain registered second neural (Continued)

image data. The decoding unit decodes the second neural image data based on a preset region of interest to obtain representation data for neural activity. The feedback unit obtains a feedback control signal based on the representation data for neural activity for performing closed-loop feedback. Methods are performed using such a system.

10 Claims, 9 Drawing Sheets

(56) References Cited

U.S. PATENT DOCUMENTS

| | | | |
|---|---|---|---|
| 2016/0328847 | A1 | 11/2016 | Santiago Flores et al. |
| 2020/0192478 | A1 | 6/2020 | Alcaide et al. |
| 2021/0196980 | A1 | 7/2021 | Howard |

FOREIGN PATENT DOCUMENTS

| | | | |
|---|---|---|---|
| CN | 104182042 | A | 12/2014 |
| CN | 104375635 | A | 2/2015 |
| CN | 105074775 | A | 11/2015 |
| CN | 107224273 | A | 10/2017 |
| CN | 108968955 | A | 12/2018 |
| CN | 114356074 | * | 11/2021 |
| CN | 114052765 | A | 2/2022 |
| CN | 114356074 | A | 4/2022 |
| CN | 11426513 | A | 6/2022 |
| CN | 114708313 | A | 7/2022 |
| CN | 115035149 | A | 9/2022 |
| CN | 115358264 | A | 11/2022 |
| CN | 103607951 | A | 2/2025 |
| GB | 2448421 | A | 10/2008 |
| GB | 2579618 | B | 12/2022 |
| WO | 2017/112679 | A1 | 6/2017 |
| WO | 2023/285815 | A1 | 1/2023 |

OTHER PUBLICATIONS

Dahua, Wen, Real-Time Processing System of SAR Optical Processor's Image, Optics and Precision Engineering, vol. 5, No. 2, (Apr. 1997), 19 pages with machine translation.

International Search Report for Application No. PCT/CN2023/084459 dated Oct. 22, 2023, 2 pages.

International Written Opinion for Application No. PCT/CN2023/084459 dated Oct. 22, 2023, 7 pages with machine translation.

Le et al., Progress in Brain Neural Connectomics, Scientia Sinica Vitae, (2018), vol. 48, No. 3, 41 pages with machine translation.

Ling, Fu, Progress in Optical Neuron Imaging, Acta Biophysica Sinica, (Aug. 2007), vol. 23, No. 4, 28 pages with machine translation.

Lingkui et al., Optical Implementation of Neural Network, Semiconductor Optoelectronics, (Dec. 1992), vol. 13, No. 4, 18 pages with machine translation.

* cited by examiner

OPTICAL BRAIN-COMPUTER INTERFACE SYSTEM AND METHOD

CROSS-REFERENCE TO RELATED APPLICATIONS

This application is a national phase entry under 35 U.S.C. § 371 of International Patent Application PCT/CN2023/084459, filed Mar. 28, 2023, designating the United States of America and published as International Patent Publication WO 2024/168994 A1 on Aug. 22, 2024, which claims the benefit under Article 8 of the Patent Cooperation Treaty of Chinese Patent Application Serial No. 202310131178.9, filed Feb. 17, 2023.

TECHNICAL FIELD

The present disclosure relates to the field of biomedicine, and, in particular, to an optical brain-computer interface system and method.

BACKGROUND

Through a brain-computer interface technology, a patients' neural signal can be recorded, activity information is interpreted from the neural signal, and operation of artificial devices is controlled by feedback. However, in the brain-computer interface technology, neuronal signals need to be obtained through an electrode technology, implanting electrodes may cause damage to neural tissue, and can only collect the activities of some neurons in certain brain regions. At the same time, it lacks information of neuronal types and has no capabilities of long-term stable tracking and recording, and thus neurons cannot be fully utilized for loop operations.

To the end, the optical brain-computer interface technology proposed to track large-scale neuronal activities through optical recording methods and to more effectively learn, in combination with optical information, rules of neural loop operation and brain function, improving motion control performance of a brain-computer interface.

However, the rapid development of the optical recording methods has put forward high-performance requirements for processing optical neural signals. Different optical information modes and different sensor devices under a same mode may produce different data structures. Although sensor device manufacturers usually equip an appropriate data acquisition software, it is difficult to directly obtain underlying data of the sensor devices through the data acquisition software, and impossible to track the neural signals using the underlying data of the sensor devices. The optical neural signals are processed with poor real-time performance, which cannot meet requirements for closed-loop feedback of a brain-computer interface system.

BRIEF SUMMARY

The present disclosure provides an optical brain-computer interface system and method to solve defects in the related art that it is difficult to directly obtain underlying data of the sensor devices through the data acquisition software, and impossible to track the neural signals using the underlying data of the sensor devices, and the optical neural signals are processed with poor real-time performance, which cannot meet requirements for closed-loop feedback of a brain-computer interface system.

The present disclosure provides an optical brain-computer interface system, including:

- an acquisition unit used for obtaining an optical neural signal from an optical acquisition device based on a preset interface;
- a preprocessing unit used for preprocessing the optical neural signal to obtain first neural image data, where the first neural image data includes at least one layer of image data;
- a registration unit used for performing parallel registration on the first neural image data based on a preset first registration algorithm and a preset second registration algorithm, to obtain registered second neural image data;
- a decoding unit used for decoding the second neural image data based on a preset region of interest to obtain representation data for neural activity; and
- a feedback unit used for obtaining a feedback control signal based on the representation data for neural activity for performing closed-loop feedback.

According to the optical brain-computer interface system provided by the present disclosure, preprocessing the optical neural signal to obtain the first neural image data includes:

- regularizing the optical neural signal based on an operation mode of the optical acquisition device to obtain the first neural image data.

According to the optical brain-computer interface system provided by the present disclosure, the preprocessing unit is further used for numbering the first neural image data.

According to the optical brain-computer interface system provided by the present disclosure, the preprocessing unit is further used for controlling start-up or shutdown and an operation mode of the optical acquisition device.

According to the optical brain-computer interface system provided by the present disclosure, performing parallel registration on the first neural image data based on the preset first registration algorithm and the preset second registration algorithm to obtain the registered second neural image data includes:

- preprocessing reference image data obtained in advance to obtain preprocessed reference image data;
- performing global registration on the first neural image data based on the first registration algorithm and the preprocessed reference image data;
- performing local registration on first neural image data subjected to the global registration based on the second registration algorithm and the preprocessed reference image data; and
- obtaining the second neural image data based on a registration result of the local registration.

According to the optical brain-computer interface system provided by the present disclosure, preprocessing the reference image data obtained in advance to obtain the preprocessed reference image data includes:

- performing global preprocessing on the reference image data based on the first registration algorithm;
- performing local preprocessing on the reference image data based on the second registration algorithm; and
- obtaining the preprocessed reference image data based on a result of the global preprocessing and a result of the local preprocessing.

According to the optical brain-computer interface system provided by the present disclosure, the registration unit is further used for obtaining the first neural image data based on a preset polling drive mode.

According to the optical brain-computer interface system provided by the present disclosure, decoding the second neural image data based on the preset region of interest to obtain the representation data for neural activity includes:

determining regions of interest in the second neural image data based on the preset region of interest; and calculating a value and a trend of change of each of the regions of interest in the second neural image data to obtain the representation data for neural activity.

The optical brain-computer interface system provided by the present disclosure further includes:

a storage unit used for storing the first neural image data and the second neural image data separately.

The present disclosure further provides an optical brain-computer interface method, including:

obtaining an optical neural signal from an optical acquisition device based on a preset interface;

preprocessing the optical neural signal to obtain first neural image data;

performing parallel registration on the first neural image data based on a preset first registration algorithm and a preset second registration algorithm, to obtain registered second neural image data;

decoding the second neural image data based on a preset region of interest to obtain representation data for neural activity; and obtaining a feedback control signal based on the representation data for neural activity for performing closed-loop feedback.

In the optical brain-computer interface system and method provided by the present disclosure, the underlying optical neural signal is directly obtained from the optical acquisition device through an interface, without need for the data acquisition software equipped by manufacturers. Tracking steps such as preprocessing, registration, decoding, etc., can be performed in real time on the underlying optical neural signal and the feedback control signal can be also obtained based on the decoded representation data for neural activity for performing closed-loop feedback.

BRIEF DESCRIPTION OF THE DRAWINGS

To illustrate solutions in the present disclosure or the related art more clearly, the drawings needed to be used in the descriptions of the embodiments or the related art will be briefly introduced below. The drawings in the following description are some embodiments of the present disclosure, and other drawings can be obtained based on the drawings for those skilled in the art without any creative work.

REFERENCE NUMERALS

Figure 1:
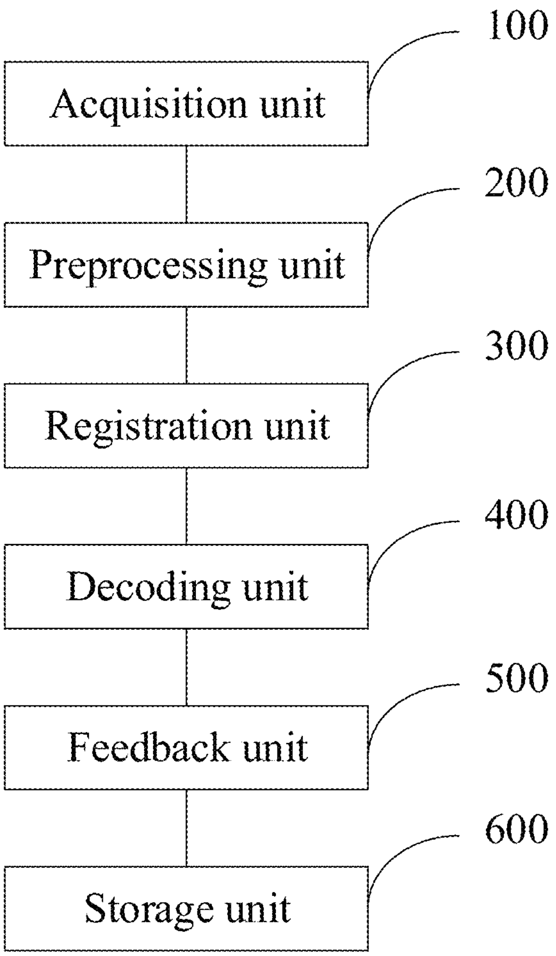
FIG. 1 is a first schematic structural diagram of an optical brain-computer interface system according to the present disclosure.

100: acquisition unit; 200: preprocessing unit; 300: registration unit; 400: decoding unit; 500: feedback unit; 600: storage unit.

DETAILED DESCRIPTION

To illustrate objectives, solutions and advantages of the present disclosure, the solutions of the present disclosure are described clearly and completely below in combination with the drawings in the present disclosure. The described embodiments are part of the embodiments of the present disclosure, not all of them. All other embodiments obtained by those skilled in the art based on the embodiments of the present disclosure without any creative work fall within the protection scope of the present disclosure.

In the description of embodiments of the present disclosure, it should be noted that, the orientation or positional relations specified by terms such as "central," "longitudinal," "lateral," "up," "down," "front," "back," "left," "right," "vertical," "horizontal," "top," "bottom," "inner," "outer" and the like, are based on the orientation or positional relations shown in the drawings, which is merely for convenience of description of the present disclosure and to simplify description, but does not indicate or imply that the stated devices or components must have a particular orientation and be constructed and operated in a particular orientation, and thus it should not be construed as limiting the present disclosure. Furthermore, the terms "first," "second," "third" and the like are only used for descriptive purposes and should not be construed as indicating or implying a relative importance.

In the description of embodiments of the present disclosure, it should be noted that, unless otherwise explicitly specified and defined, the terms "connected to" and "connected" shall be understood broadly. For example, it may be either fixedly connected or detachably connected, or may be integrally connected; it may be either mechanically connected, or electrically connected; it may be either directly connected, or indirectly connected through an intermediate medium. The specific meanings of the terms above in embodiments of the present disclosure may be understood by those skilled in the art in accordance with specific conditions.

In the embodiments of the present disclosure, unless otherwise clearly stated and defined, the first feature being located "on" or "under" the second feature means that the first feature is in direct contact with the second feature or the first feature is in contact with the second feature by an intermediate medium. In addition, the first feature is "on," "above" and "over" the second feature can refer to that the first feature is directly above or obliquely above the second feature, or simply refer to that the level of the first feature is higher than that of the second feature. The first feature is "under," "below" and "beneath" the second feature can refer to that the first feature is directly below or obliquely below the second feature, or simply refer to that the level of the first feature is lower than that of the second feature.

In the description of the present specification, description with reference to the terms "one embodiment," "some embodiments," "an example," "specific example," "some examples" and the like, refers to that specific features, structures, materials or characteristics described in combination with an embodiment or an example are included in at least one embodiment or example of the embodiments of the present disclosure. In the present specification, the schematic expressions of the above terms are not necessarily directed to the same embodiment or example. Furthermore, the particular features, structures, materials or characteristics described may be combined in any suitable manner in any one or more embodiments or examples. In addition, those skilled in the art may combine the different embodiments or examples described in this specification, as well as the features of the different embodiments or examples, without conflicting each other.

FIG. 1 is a first schematic structural diagram of an optical brain-computer interface system according to the present disclosure. As shown in FIG. 1, the optical brain-computer interface system according to the present disclosure includes:

an acquisition unit 100 used for obtaining an optical neural signal from an optical acquisition device based on a preset interface;

a preprocessing unit 200 used for preprocessing the optical neural signal to obtain first neural image data, where the first neural image data includes at least one layer of image data;

a registration unit 300 used for performing parallel registration on the first neural image data based on a preset first registration algorithm and a preset second registration algorithm, to obtain registered second neural image data;

a decoding unit 400 used for decoding the second neural image data based on a preset region of interest to obtain representation data for neural activity; and a feedback unit 500 used for obtaining a feedback control signal based on the representation data for neural activity for performing closed-loop feedback.

The optical acquisition device may be an optical sensor or an optical camera, and the preset interface is a device that may communicate with a data interface of the optical acquisition device. The acquisition unit 100 of the present disclosure includes a plurality of communication interfaces, which may be connected to and communicate with the commonly used optical acquisition device. For example, the optical acquisition device is a high-speed fluorescence camera commonly used in the biological field, and the acquisition unit 100 is connected to the high-speed fluorescence camera through the Camera Link protocol interface to directly obtain underlying data from the high-speed fluorescence camera.

The Camera Link protocol interface has three configurations, namely Base, Medium, and Full, and mainly solves a problem of data transmission volume, through which transmission at high speed is enabled, and suitable configurations and connection methods for cameras of different speeds are provided.

Figure 2:
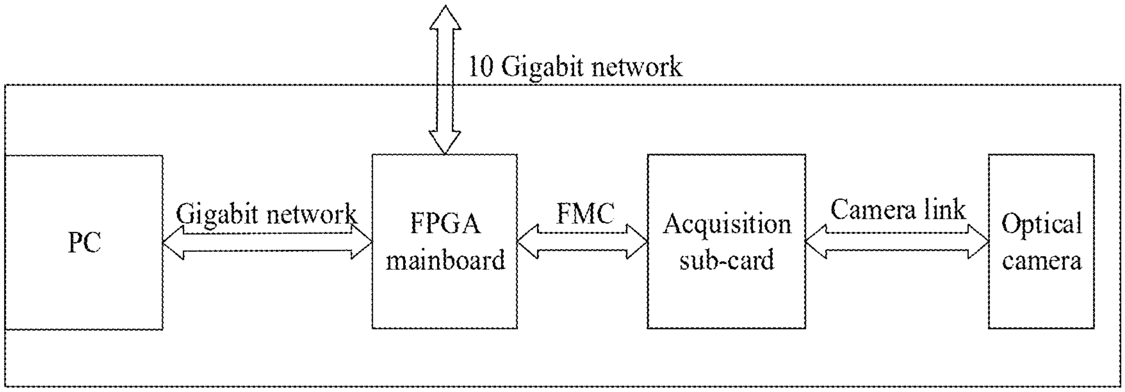
FIG. 2 is a block diagram showing principles of an acquisition unit and a preprocessing unit according to the present disclosure.

FIG. 2 is a block diagram showing principles of an acquisition unit and a preprocessing unit according to the present disclosure. As shown in FIG. 2, the acquisition unit 100 may use an acquisition sub-card, and the number of acquisition sub-cards may be set based on actual needs, which is not limited in the present disclosure.

In an embodiment, the preprocessing unit 200 includes a field programmable gate array (FPGA) mainboard and a management terminal. The acquisition sub-card is inserted into the FPGA mainboard for operation. A connection interface between the acquisition sub-card and the FPGA mainboard is a FPGA Mezzanine card (FMC) interface. The FPGA mainboard may be connected to the management terminal through a high-speed network port. The management terminal may be a laptop, a desktop computer, an all-in-one computer, etc.

Figure 3:
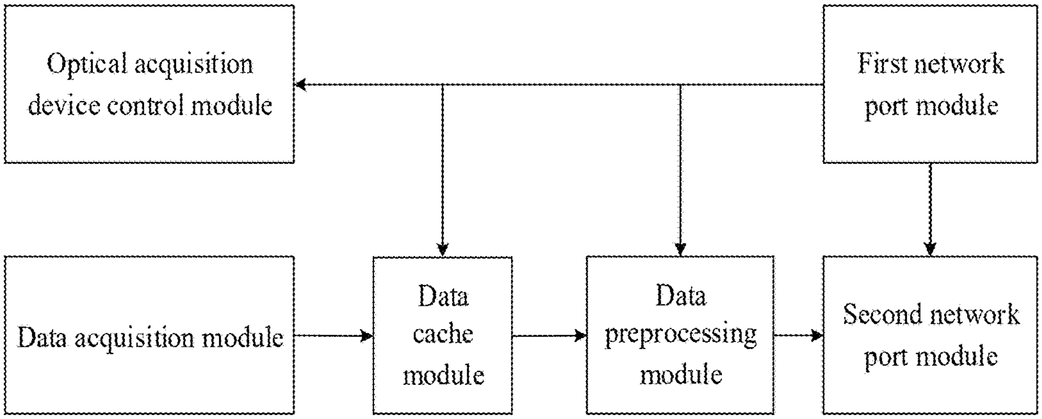
FIG. 3 is a schematic diagram showing program modules of a preprocessing unit according to the present disclosure.

FIG. 3 is a schematic diagram showing program modules of a preprocessing unit according to the present disclosure. As shown in FIG. 3, the FPGA mainboard is used for receiving an optical neural signal, preprocessing the optical neural signal and forwarding first neural image data. The FPGA mainboard includes a data acquisition module, a data cache module, a data preprocessing module, a first network port module, an optical acquisition device control module and a second network port module.

The data acquisition module is used for completing reception and analysis of the optical neural signal. The data cache module is used for caching the analyzed optical neural signal. The data preprocessing module is used for preprocessing the optical neural signal and regularizing the optical neural signal into the first neural image data. Methods for preprocessing include image cropping, filtering, format conversion, etc. The first network port module is used for receiving control instructions from the management terminal, including a control instruction from the optical acquisition device and a control instruction from each module of the FPGA mainboard. The first network port module is further used for uploading status information of each module of the FPGA mainboard and the optical acquisition device, as well as some intermediate results obtained by preprocessing the optical neural signal. The optical acquisition device control module is used for receiving a control instruction of the optical acquisition device from the first network port module, converting the control instruction into a command with format recognizable by the optical acquisition device and sending the command to the acquisition sub-card, and the acquisition sub-card sends the command to the optical acquisition device for real-time control of the optical acquisition device. The second network port module is used for dynamically forwarding the first neural image data.

In an embodiment, the first network port module is specifically a Gigabit network port module, which implements the Gigabit network protocol, and the second network port module is specifically a 10 Gigabit network port module which, implements the 10 Gigabit network protocol. Data may be dynamically forwarded by setting different destination IP addresses.

The registration unit 300 is a heterogeneous computing platform using a CPU and multiple graphics processing units (GPUs), which implements a compute unified device architecture (CUDA)-based parallel image registration algorithm, increases a speed of image registration while ensuring the accuracy of image registration, and rapidly registers high-resolution images under the background of massive images.

In an embodiment, the first registration algorithm is a frequency-domain phase correlation-based registration algorithm, and the second registration algorithm is a template matching-based registration algorithm.

Both the decoding unit 400 and the feedback unit 500 implement the corresponding functions through the CPU.

Figure 4:
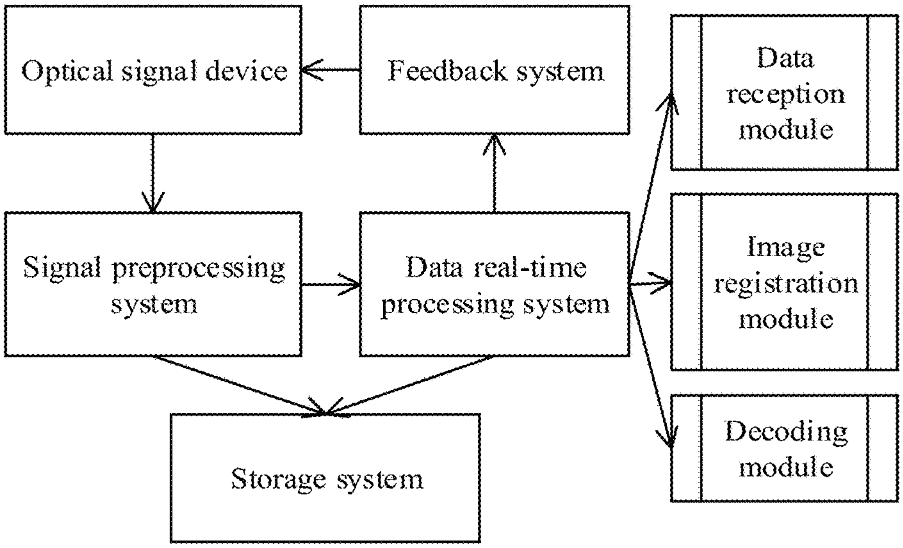
FIG. 4 is a second schematic structural diagram of an optical brain-computer interface system according to the present disclosure.

FIG. 4 is a second schematic structural diagram of an optical brain-computer interface system according to the present disclosure. As shown in FIG. 4, in another embodiment, the acquisition unit 100 and the preprocessing unit 200 may be integrated into an all-in-one structure to form an acquisition and preprocessing system. The registration unit 300, the decoding unit 400 and the feedback unit 500 may be integrated into one, such as a server configured with a CPU and multiple GPU cards, and form a data real-time processing system, thus processing image data reception, image registration, brain region observation, and signal feedback under high bandwidth in real time.

It may be understood that in the present disclosure, the underlying optical neural signal is directly obtained from the optical acquisition device through an interface, without need for the data acquisition software equipped by manufacturers. Tracking steps such as preprocessing, registration, decoding, etc., can be performed in real time on the underlying optical neural signal and the feedback control signal can be also obtained based on the decoded representation data for neural activity for performing closed-loop feedback.

Based on the above embodiment, in an optional embodiment, preprocessing the optical neural signal to obtain the first neural image data includes:

- regularizing the optical neural signal based on an operation mode of the optical acquisition device to obtain the first neural image data.

Regularizing the optical neural signal is to regularize collected data into orderly complete image data.

Different optical acquisition devices have different corresponding operation modes and data formats. For example, a high-speed fluorescent camera commonly used in the biological field has an operation mode in which the optical device scans two rows of data each time starting from the middle to both sides.

The preprocessing unit 200 is used for calibrating data rows, and after receiving all the data, sorting the data rows to form a complete image data with orderly data rows.

It may be understood that in the present disclosure, after scanned data of the optical acquisition device are obtained, the scanned data is calibrated in real time. After the optical acquisition device completes scanning all the data, calibration of the data rows is also completed, without waiting for processing the data using a software equipped in the optical acquisition device, thus realizing real-time data acquisition.

Based on the above embodiment, in an optional embodiment, the preprocessing unit 200 is further used for numbering the first neural image data.

In an embodiment, the first neural image data includes image data corresponding to the whole-brain neural signal, consisting of layers of image data, and there is a need for numbering the orders of image data.

In an embodiment, the system according to the present disclosure further includes a timing control unit used for receiving an instruction from the management terminal and generating a timing control signal, that is, a timing pulse. The timing control unit may generate a first trigger pulse signal for triggering exposure of the optical acquisition device and a second trigger pulse signal for characterizing layer number information of the image data corresponding to this exposure. The number of pulses of the second trigger pulse signal within a specific period of time since the exposure is started represents a layer number, and the first trigger pulse signal and the second trigger pulse signal are synchronized. The timing control unit may further be used for generating other timing control signals, such as light source control.

The preprocessing unit 200 may receive the second trigger pulse signal to synchronize the number of an image layer of the regularized first neural image data.

It may be understood that the preprocessing unit 200 may number the first neural image data in batch, improving the real-time performance of data processing.

Based on the above embodiment, in an optional embodiment, the preprocessing unit is further used for controlling instructions for controlling start-up or shutdown and an operation mode of the optical acquisition device.

It may be understood that the preprocessing unit 200 converts the control instruction of the optical acquisition device into a command with format recognizable by the optical acquisition device, and sends the command to the optical acquisition device through the preset interface of the acquisition unit 100, without the need for control through the software provided by the manufacturer, improving the real-time performance of feedback.

Based on the above embodiment, in an optional embodiment, performing parallel registration on the first neural image data based on the preset first registration algorithm and the preset second registration algorithm to obtain the registered second neural image data includes:

- preprocessing reference image data obtained in advance to obtain preprocessed reference image data;
- performing global registration on the first neural image data based on the first registration algorithm and the preprocessed reference image data;
- performing local registration on first neural image data subjected to the global registration based on the second registration algorithm and the preprocessed reference image data; and
- obtaining the second neural image data based on a registration result of the local registration.

Figure 6:
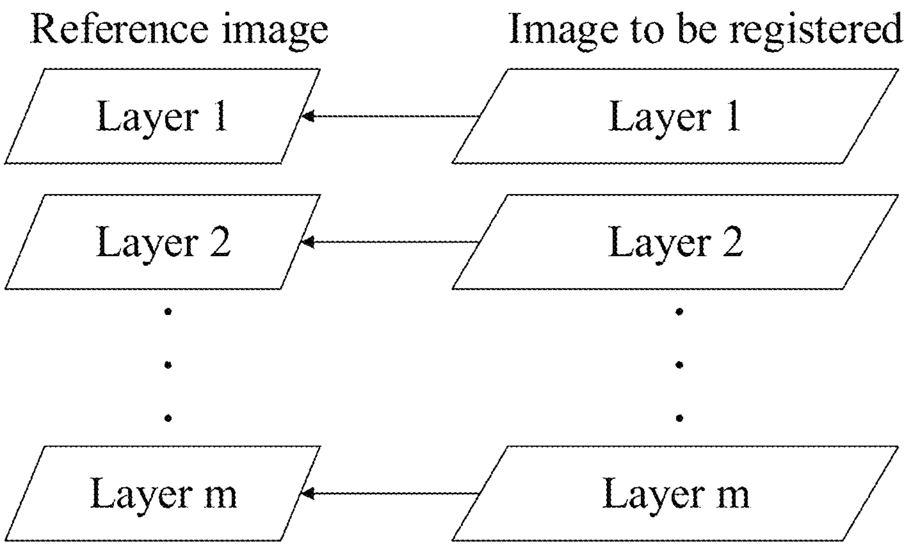
FIG. 6 is a schematic diagram of an inter-layer registration relationship between image data to be registered and reference image data according to the present disclosure.

FIG. 6 is a schematic diagram of an inter-layer registration relationship between image data to be registered and reference image data according to the present disclosure. As shown in FIG. 6, in an embodiment, the image registration is a registration between the same-layer of images of the whole brain, and the number of image layers is 1, and the number of reference images is also 1. The registration unit 300 needs to acquire reference image data and preprocess the reference image data when the registration unit 300 is first started. To ensure the reliability of the data, the number of reference image data collected for each layer is multiple, the reference image data are preprocessed and then averaged as the preprocessed reference image data of this layer.

Figure 7:
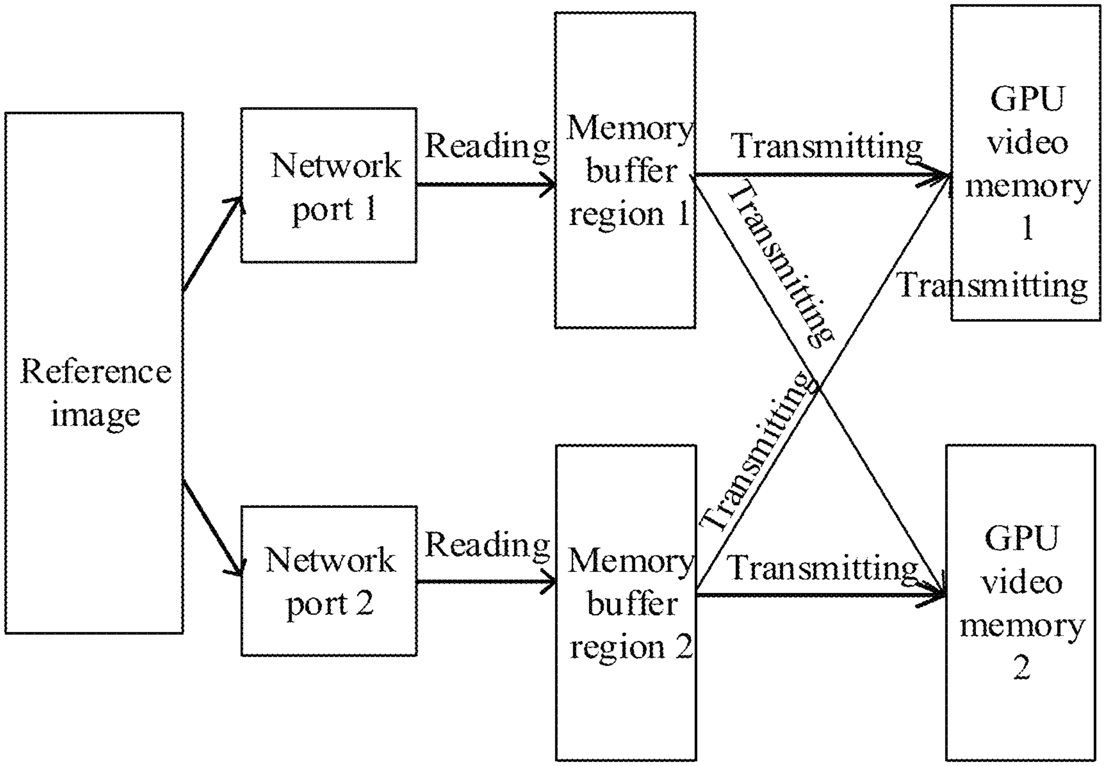
FIG. 7 is a schematic diagram of transmission of reference image data according to the present disclosure.
Figure 8:
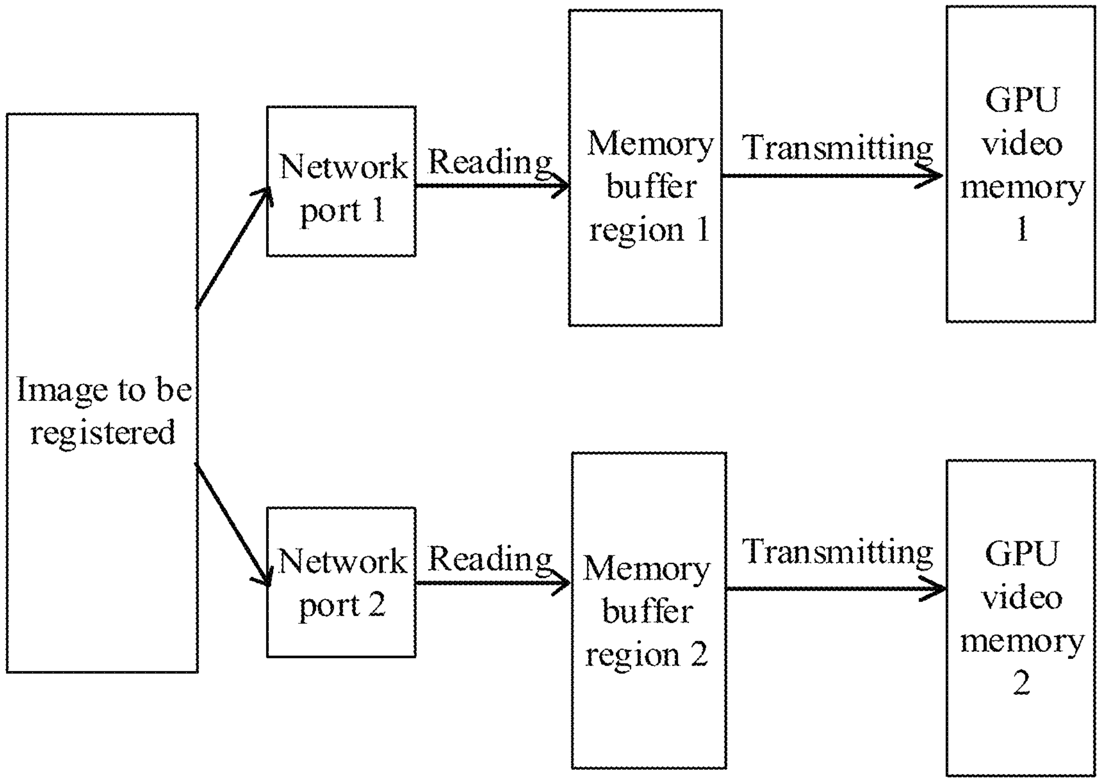
FIG. 8 is a schematic diagram of transmission of image data to be registered according to the present disclosure.
Figure 9A:
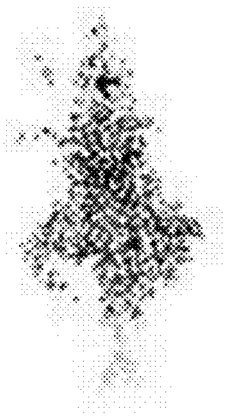
FIGS. 9A-9D are schematic diagrams of the extraction of region of interest (ROI) according to the present disclosure.
Figure 9B:
Figure 9C:
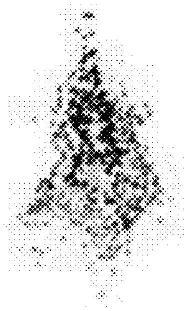
Figure 9D:
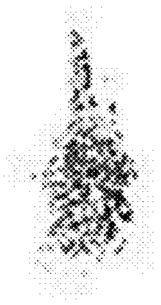

FIG. 7 is a schematic diagram of transmission of reference image data according to the present disclosure; and FIG. 8 is a schematic diagram of transmission of image data to be registered according to the present disclosure. As shown in FIG. 7 and FIG. 8, The reference image data is first cached in a memory, but since the calculation for the image registration is completed in the GPU, the preprocessed reference image data needs to be stored in a video memory to provide reference data for subsequent registration of image data. Since the reference image data received from each network port are different, the complete preprocessed reference image data needs to be saved in each GPU video memory in order to ensure the integrity and reliability of image registration. The image registration operation is completed in parallel in multiple GPU cards, and different images are registered. There is no need to store all images in each GPU video memory, but only the image data corresponding to a memory buffer pool need to be stored. The image registration is performed in units of a single image. After receiving the image to be registered, each GPU performs registration based on a registration algorithm flow. The registration algorithm flow includes global registration and local registration.

In an embodiment, global registration is to perform Fourier transform on original image data and the reference image data, obtain offset vectors of the original image data relative to the reference image data using a phase correlation method, and perform position adjustment registration on the original image data.

The first registration algorithm is a frequency-domain phase correlation-based registration algorithm and used for solving an image registration problem with translation parameters. According to the properties of two-dimensional Fourier transform: a translation in a spatial domain is equivalent to a translation in a frequency domain phase, and a translation vector of two images may be directly calculated by a phase of a cross-power spectrum.

It is assumed that $f_1(x,y)$ and $f_2(x,y)$ are two image signals that satisfy a relationship of formula (1). That is, $f_2(x,y)$ is obtained by performing simple translation on $f_1(x,y)$, $$f_2(x, y) = f_1(x - x_0, y - y_0) \tag{1}$$

x and y represent two-dimensional coordinates of a certain image data in the image, x represents a horizontal coordinate, y represents a vertical coordinate; $x_0$ and $y_0$ represent coordinate translation offsets, $x_0$ represents a horizontal coordinate translation offset, $y_0$ represents a vertical coordinate translation offset.

Formula (2) is obtained based on properties of Fourier transform, $$F_2(u, v) = F_1(u, v)e^{-j2\pi(ux_0+vy_0)} \tag{2}$$

u and v represent two-dimensional coordinates of the image data subjected to Fourier transform, u represents horizontal coordinate data, and v represents vertical coordinate data.

$F_1(u,v)$ and $F_2(u,v)$ in the formula (2) are Fourier transforms of $f_1(x,y)$ and $f_2(x,y)$, respectively, and normalized cross-power spectrum is expressed by formula (3):

$$\frac{F_1^*(u, v)F_2(u, v)}{|F_1^*(u, v)F_2(u, v)|} = e^{-j2\pi(ux_0+vy_0)} \tag{3}$$

in the formula (3):

$$F_1^*(u, v)$$

is the complex conjugate of $F_1(u,v)$; a two-dimensional pulse function $\delta(x-x_0,y-y_0)$ formed at a spatial position $(x_0, y_0)$ may be obtained by performing inverse Fourier transform on $$e^{-j2\pi(ux_0+vy_0)},$$

and only inverse Fourier transform needs to be performed on the left part of the formula (3).

The frequency-domain phase correlation method is to perform inverse Fourier transform on formula (3), and then find the peak position (pulse position) to determine the translation parameters $x_0$ and $y_0$, that is, the peak position $(x_0, y_0)$ is the offset vector of the image to be registered.

In an embodiment, local registration is based on global registration and to perform, using the same template sliding method, image data segmentation on the reference image data and the image data to be registered, register the segmented template image data, calculate the number n of sub-image data to be registered based on a size of the template image data and a sliding step, register n sub-image data among the image to be registered with the n template reference image data among the reference image data one by one, perform phase correlation registration on two template image data with the same logical spatial position (i.e., one template image data among the image data to be registered and one template image data among the reference image data) to obtain an offset vector of the local template image data, and after sequentially registering to obtain n sets of offset vectors, perform position adjustment registration on the entire image data to be registered.

Figure 5:
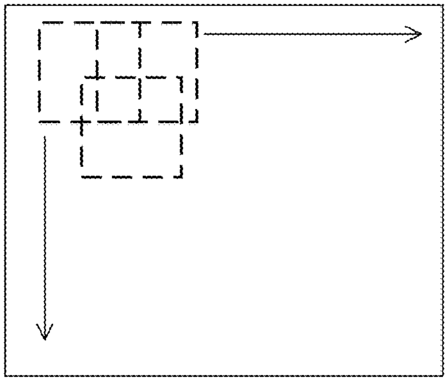
FIG. 5 is a schematic diagram of sliding of a template image window according to the present disclosure.

FIG. 5 is a schematic diagram of sliding of a template image window according to the present disclosure. As shown in FIG. 5, template matching refers to defining a template A in the image data to be registered, searching for the template B with the highest matching degree among the reference image data, and then determining a registration parameter between the two images based on a translation relationship between the two templates.

It is assumed that template A and reference image are $f_2(x,y)$ and $f_1(x,y)$, respectively, a normalized correlation (NC) coefficient between the window at the reference image position (l,m) and template A is $$C(l, m) = \frac{\left[\sum_x\sum_y f_2(x, y)f_1(l, m)\right]^2}{\sum_x\sum_y [f_2(x, y)]^2 \sum_x\sum_y [f_1(l + x, m + y)]^2} \tag{4}$$

l and m refer to two-dimensional coordinate position of the template image searched among the reference image in the reference image, l represents a horizontal coordinate, and m represents a vertical coordinate.

It is assumed that the number of GPUs is 2, the registration algorithm is divided into global registration and local registration. First, global registration is performed, then the image segmentation is performed based on the result of global registration, and local registration is performed. Global registration template: In each GPU, Fourier transform is performed on the entire image based on the Fourier transform-based registration algorithm, and its frequency domain data are saved in the video memory. The data are global registration data.

Template image segmentation is completed in each GPU, and the window sliding method is used for segmentation based on the defined parameters, as shown in FIG. 4. The number N of segmented small images is calculated as formulas (5) to (7):

$$N = Wn * Wm \quad (5)$$

$$Wn = \frac{W - Sw * 2}{D} + 1 \quad (6)$$

$$Wm = \frac{H - Sh * 2}{D} + 1 \quad (7)$$

W represents a width of the image, H represents a height of the image, Sw represents a width of a sliding window, Sh represents a height of the sliding window, and D represents a sliding step of a window.

After the reference image is segmented, tasks are divided based on the number N of the small images and the resolution size Sw*Sh of the small images, and parallel calculation are completed in a kernel of the GPU. That is, Fourier transform is performed on each small image based on the Fourier transform-based registration algorithm, and its frequency domain data are saved in the video memory. The data are local registration template data.

During the registration process, tasks are divided based on the number of GPUs and buffer regions. During each task processing process, GPUs and buffer regions correspond one to one. That is, GPU1 processes the image to be registered in buffer region 1, and GPU2 processes the image data to be registered in buffer region 2, so as to realize parallel processing of massive images. Each buffer region may store a maximum of P images at a time $$P = M/2 \quad (8)$$

where M represents a total number of images to be registered.

It may be understood that in the present disclosure, parallel registration is performed on the first neural image data through the first registration algorithm and the second registration algorithm, greatly improving the speed of image data registration.

Based on the above embodiment, in an optional embodiment, preprocessing the reference image data obtained in advance to obtain the preprocessed reference image data includes:

- performing global preprocessing on the reference image data based on the first registration algorithm;
- performing local preprocessing on the reference image data based on the second registration algorithm; and
- obtaining the preprocessed reference image data based on a result of the global preprocessing and a result of the local preprocessing.

In an embodiment, global preprocessing refers to performing Fourier transform on the entire reference image data. It is assumed that $f_1(x,y)$ is the reference image data, and $F_1(u,v)$ is obtained through Fourier transform, and its complex conjugate $$F_1^*(u, v)$$

is further obtained, and $$F_1^*(u, v)$$

data is stored in the video memory.

In an embodiment, local preprocessing refers to obtaining n template reference image data based on the window sliding method, and processing the n template reference image data in sequence based on the global preprocessing method to obtain n sets of complex conjugate data, and storing the n sets of complex conjugate data in the video memory.

It may be understood that the present disclosure helps to improve the real-time performance of the first neural image data registration by preprocessing the reference image data in advance.

Based on the above embodiment, in an optional embodiment, the registration unit 300 is further used for obtaining the first neural image data based on a preset polling drive mode.

Real-time data reception is a necessary condition for real-time data processing. To ensure the real-time processing of the subsequent registration algorithm, the integrity of the received image data must be guaranteed. In the present disclosure, a multi-port 10G network card and a high-speed data acquisition IXCAP driver are used to receive image data transmitted from the real-time image acquisition system.

The registration unit may realize data reception of multiple network cards and multiple network ports based on the performance of the optical acquisition device and the requirements of data bandwidth. The image data acquired by the optical device is orderly and distributed to different network ports in units of a complete frame of image data. Multiple network ports are virtualized into a circular buffer pool, each network port is a buffer region, and each network port receives complete image data at a time. Based on the number of layers of whole-brain image data, regular cyclic reception is realized in multiple network ports.

A network port number corresponding to the i-th layer of image data is calculated through the following formula:

$$K = [(T - 1) * E + I]\% \; F \quad (9)$$

K is the network port number, F is the number of network ports, E is the number of layers of whole-brain image data, T is whole-brain time-series time, and % represents modulo operation. The present disclosure may ensure that each network port may receive a complete frame of image data, avoiding the influence of calculation delay caused by subsequent data integration.

It may be understood that in the present disclosure, the data from network cards are read using the high-speed data acquisition IXCAP driver and the polling drive mode to avoid the uncertainty of the operating system's response to interruption of the network cards and improve the reliability of system transmission.

Based on the above embodiment, in an optional embodiment, decoding the second neural image data based on the preset region of interest to obtain the representation data for neural activity includes:

- determining regions of interest in the second neural image data based on the preset region of interest; and calculating a value and a trend of change of each of the regions of interest in the second neural image data to obtain the representation data for neural activity.

A basic unit of neural activity is a neuron cluster, which is manifested as coordinated activity of a certain number of neurons and is highly dynamic. One or more neuron clusters associated with the functions may be determined based on the understanding of specific neural functions and passive observation of the neural activity, that is, different contributions of a large number of observed neurons to the functions. Different weights are allocated to respective neuron activities based on differences of these contributions, and a decoding rule of neuron group activities may be obtained. In the decoding unit 400, an optical signal of an interval where each neuron in the registered second neural image data is located reflects a neural activity level of each neuron. The optical signal is normalized to eliminate the influence of a probe expression level and an intensity of the excitation light and to obtain a neural activity signal and a variable representing the current activity state of the neural cluster is generated through the decoding rule. At the same time, a comprehensive representation of the whole brain neural activity in a lower dimensional space may be obtained based on contributions of different neurons to multiple neural clusters.

FIGS. 9A-9D are schematic diagrams of the extraction of region of interest (ROI) according to the present disclosure. As shown in FIGS. 9A-9D, ROI is extracted from the brain region and FIGS. 9A, 9B, 9C and 9D represent schematic diagrams of ROI extracted from different brain regions. During image processing, an area to be processed, also referred to as a region of interest, is outlined from the processed image in the form of a box, circle, ellipse, irregular polygon, etc.

The region of interest is marked for the registered second neural image data. A single layer of image data in the second neural image data may have a plurality of regions of interest and a sum of all pixel values in each region of interest is a ROI value of this region.

Each layer of image data has different ROI values, and a ROI position of each layer of image data needs to be determined before the data real-time processing system is started. The ROI values are calculated by a unit of a single layer of image data. Whenever a layer of image data in the second neural image data is obtained, all the ROI values of this layer of image data are calculated and all the ROI results are saved to a disk file when the system ends.

ROI is a focus of whole-brain image analysis. ROI values are the data basis for observation of brain region activity and the most intuitive observation is to normalize timing ROI and display it in real time in the form of a line graph. The whole brain is divided into multiple brain regions, and the observation of brain region activity is mainly to analyze a trend of ROI change in the same brain region.

The ROI of each layer of image data is delineated differently, and multiple ROIs of the same brain region may be distributed in different layers of image data. Therefore, observation of the brain regions is implemented in a unit of a set of whole-brain image data and a point is updated in the line graph whenever a set of whole-brain image data is calculated.

Two display modes for a ROI line graph are provided in the present disclosure based on observation requirements.

One display mode for a ROI line graph is a mode in which only a line graph of a brain region is contained in a display window and a plurality of display windows may be opened based on the number of brain regions. This mode is not limited by the number of brain regions, and the window may be zoomed in to a size of a display tool (such as a monitor) to more clearly observe the changes and values of each line graph.

Another display mode for a ROI line graph is a mode in which all line graphs of brain regions are contained in a display window and only one display window may be opened. This mode is limited by the number of brain regions, and the number of brain regions cannot exceed the number of line graphs in the display window. The number of line graphs contained in the display window may be preset, and the zoom size of each line graph is limited due to the size limit of the display tool. However, this mode is convenient for observing all line graphs at the same time, and the difference in line changes between brain regions may be clearly seen.

The number of ROI line graphs is the number of observed brain regions, and the number of lines in each line graph is the number of ROIs in the brain region.

Figure 10:
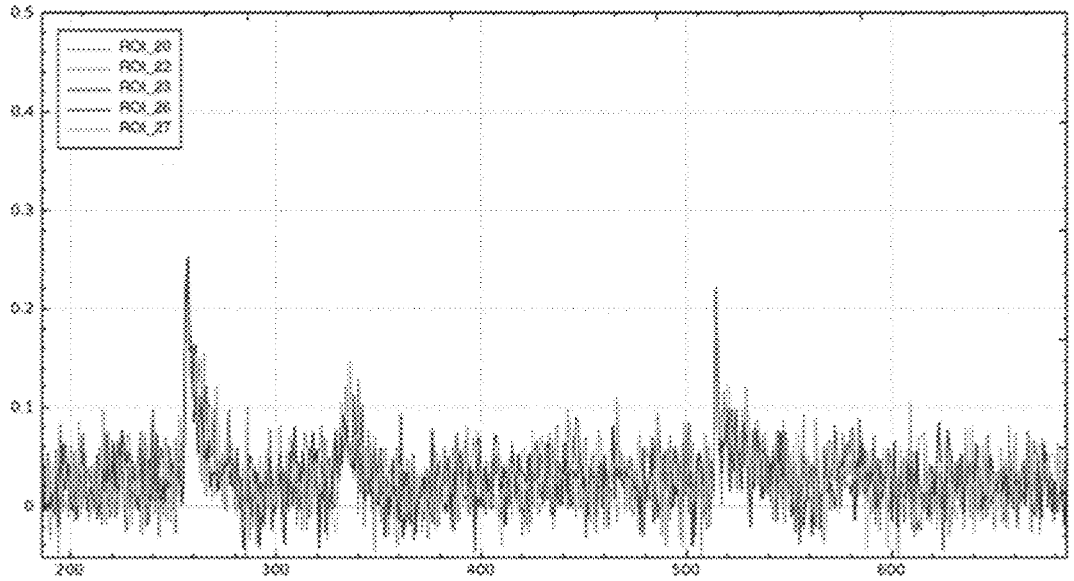
FIG. 10 is a schematic diagram showing a region of interest (ROI) line graph of a 10th brain region over a period of time.
Figure 11:
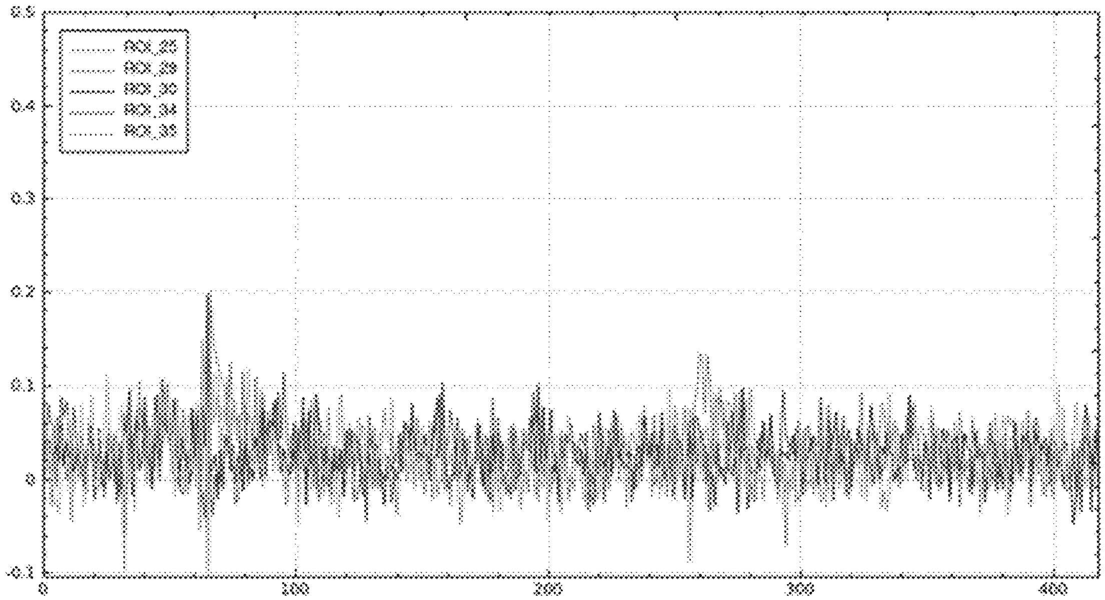
FIG. 11 is a schematic diagram showing a region of interest (ROI) line graph of a 19th brain region over a period of time.
Figure 12:
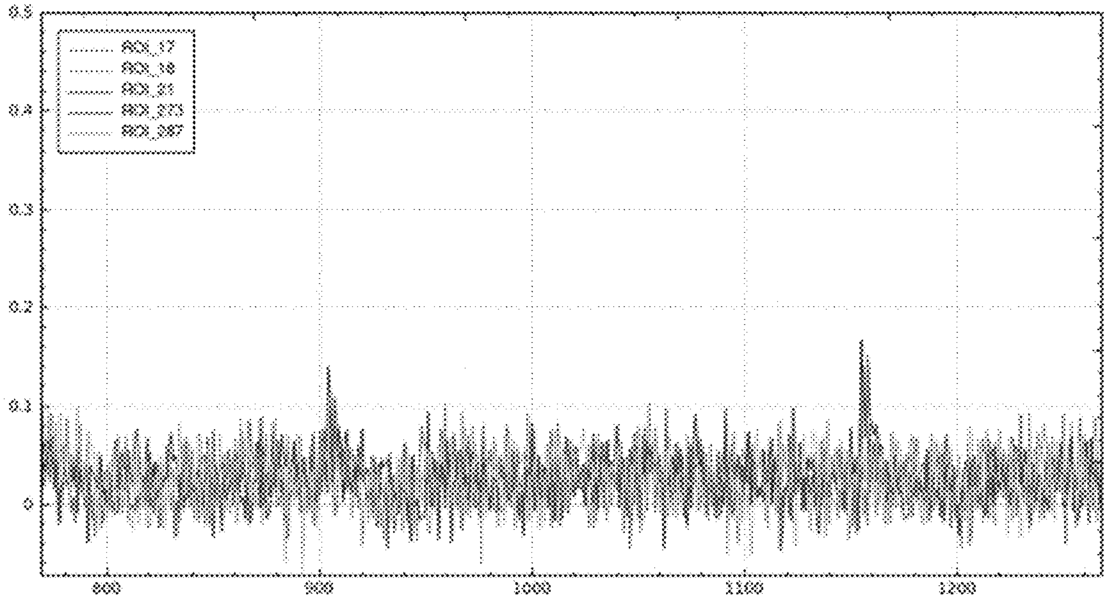
FIG. 12 is a schematic diagram showing a region of interest (ROI) line graph of a 2nd brain region over a period of time.
Figure 13:
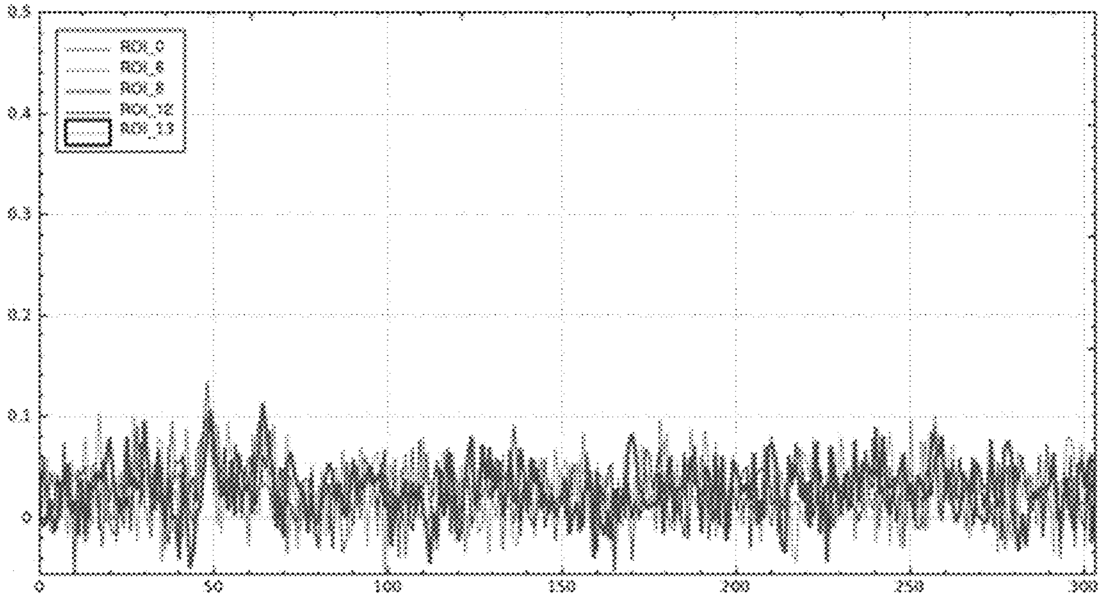
FIG. 13 is a schematic diagram showing a region of interest (ROI) line graph of a 13th brain region over a period of time.

FIG. 10 is a schematic diagram showing a region of interest (ROI) line graph of a 10th brain region over a period of time, FIG. 11 is a schematic diagram showing a region of interest (ROI) line graph of a 19th brain region over a period of time, FIG. 12 is a schematic diagram showing a region of interest (ROI) line graph of a 2nd brain region over a period of time and FIG. 13 is a schematic diagram showing a region of interest (ROI) line graph of a 13th brain region over a period of time. A large amount of image data may be generated after registration is performed in real time over a period of time. The vertical coordinates of the line graphs represent the ROI value, and the horizontal coordinates represent image group sequences under the time series.

After the ROIs of a set of whole-brain image data are calculated, feedback signal values to be output are determined using a threshold based on a feedback algorithm, that is, a method of calculating a mean and a variance, and the signal values are transmitted to a peripheral control device through a serial port.

In an embodiment of the present disclosure, different weights may be set for all ROIs in each brain region based on a relationship between the whole-brain neural signals or a contribution of the neural signals to the functions of certain brain regions, and weight combination analysis is performed.

In an embodiment of the present disclosure, calculation methods of feedback signals in two modes including a mean mode and a variance mode may be implemented based on difference in the activity amplitudes of the neural signals.

The calculation formula in the mean mode is as follows:

$$Fmean = \frac{\sum_{i=0}^{i=RNUM}(ROI_i * W_i)}{VALIDROINUM} \tag{10}$$

$$Fvar = \frac{\sum_{i=0}^{i=RNUM}(ROI_i - Fmean)^2}{VALIDROINUM} \tag{11}$$

Fmean represents feedback signals in the mean mode, Fvar represents feedback signals in the variance mode, RNUM represents the number of ROIs, $ROI_i$ represents the i-th ROI, $W_i$ represents a weight value of the i-th ROI, and VALIDROINUM represents the number of valid ROIs (i.e., the number of ROIs whose weight value is not 0).

In the present disclosure, any feedback mode may be selected as needed. For example, in case that a preset difference in the activity amplitudes of the neural signals is less than a preset first threshold, the mean mode is selected for calculation. In case that the preset difference in the activity amplitudes of the neural signal is greater than a preset second threshold, the variance mode is selected for calculation, where the second threshold is greater than the first threshold.

It may be understood that in the present disclosure, feedback signal is generated and transmitted from neural activity representation based on the control characteristics of the brain-computer interface peripheral device. The signal may be an activity state of a certain function-related neuron cluster for directly controlling to update a state of the peripheral device in a continuous manner. The signal may also be a discrimination value of its activity state level for controlling the starting and stopping of an external device. The signal may also be a combined representation or simultaneous output of the activity states of multiple neural clusters for controlling an external device with a higher degree of freedom.

Further, on the basis of the embodiments mentioned above, it further includes:

a storage unit used for storing the first neural image data and the second neural image data separately.

In an embodiment, the storage unit 600 is used to receive and store image data under high bandwidth in real time. The storage unit 600 may include a DELL server and a high-capacity disk array and use a multi-port 10G network card and a high-speed data acquisition IXCAP driver to receive and store image data under high bandwidth in real time.

The registration unit may realize data reception of multiple network cards and multiple network ports based on the performance of the optical acquisition device and the requirements of data bandwidth. The image data acquired by the optical device is orderly and distributed to different network ports in units of a complete frame of image data. Multiple network ports are virtualized into a circular buffer pool, each network port is a buffer region, and each network port receives complete image data at a time. Regular cyclic reception is implemented in multiple network ports based on the number of layers of whole-brain image data.

The storage unit 600 is mainly used to store non-registered original image to save the original data. The data is sourced from the preprocessing unit 200, which is started at the same time as the data real-time processing system.

It may be understood that in the present disclosure, by separating the storage of the original image from the processing of the data, the influence on the real-time performance of data processing is avoided and the efficiency of processing the data in real time is greatly improved.

In the present disclosure, when a large amount of whole-brain neural image data are processed in real time, the complete image to be registered is placed in the GPU video memory each time, and parallel registration is performed until the registration is completed, and the registration result is returned to the GPU memory. The CPU only performs the tasks of reading the original image and storing the registration result image, and all the steps of the registration algorithm are completed in the GPU, which greatly improves the parallel processing efficiency and real-time performance.

The optical brain-computer interface method according to the present disclosure is described below. The optical brain-computer interface method described below and the optical brain-computer interface system described above may be referred to each other.

Figure 14:
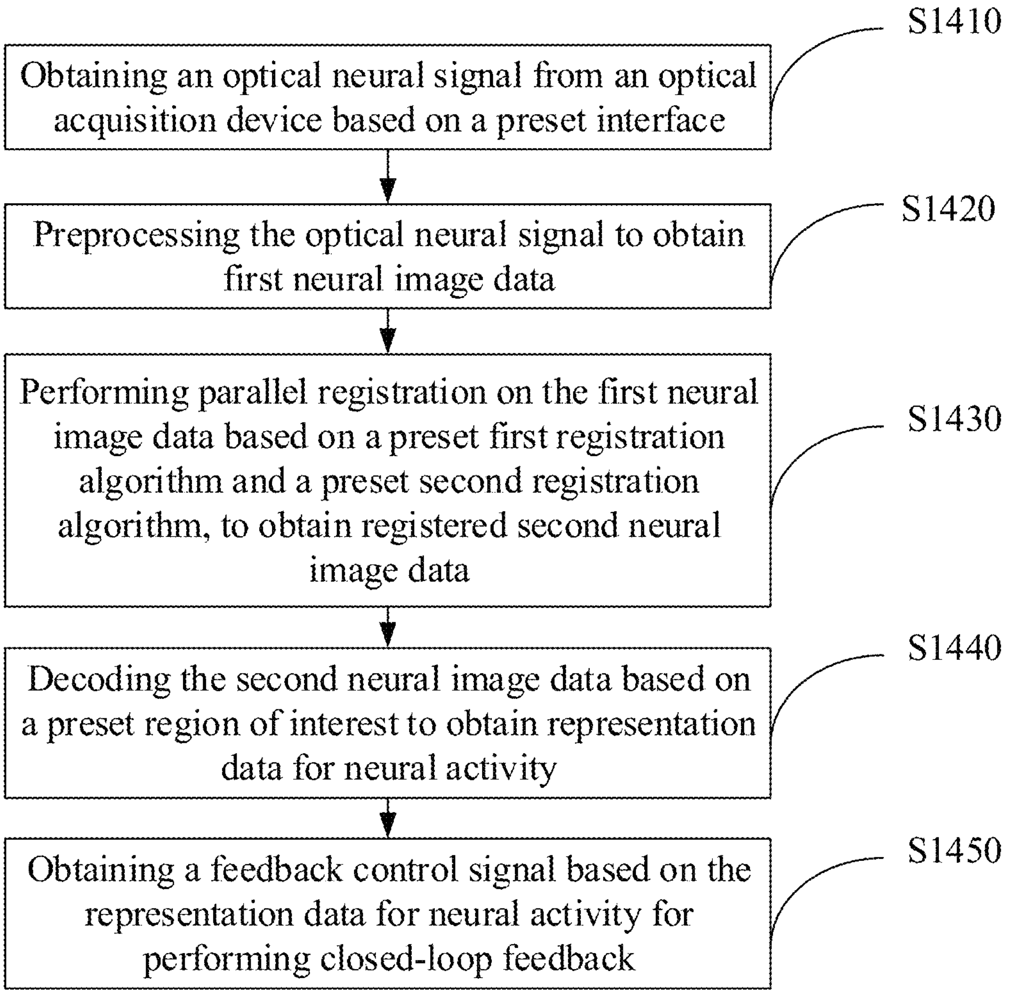
FIG. 14 is a first schematic flow chart of an optical brain-computer interface method according to the present disclosure.
Figure 15:
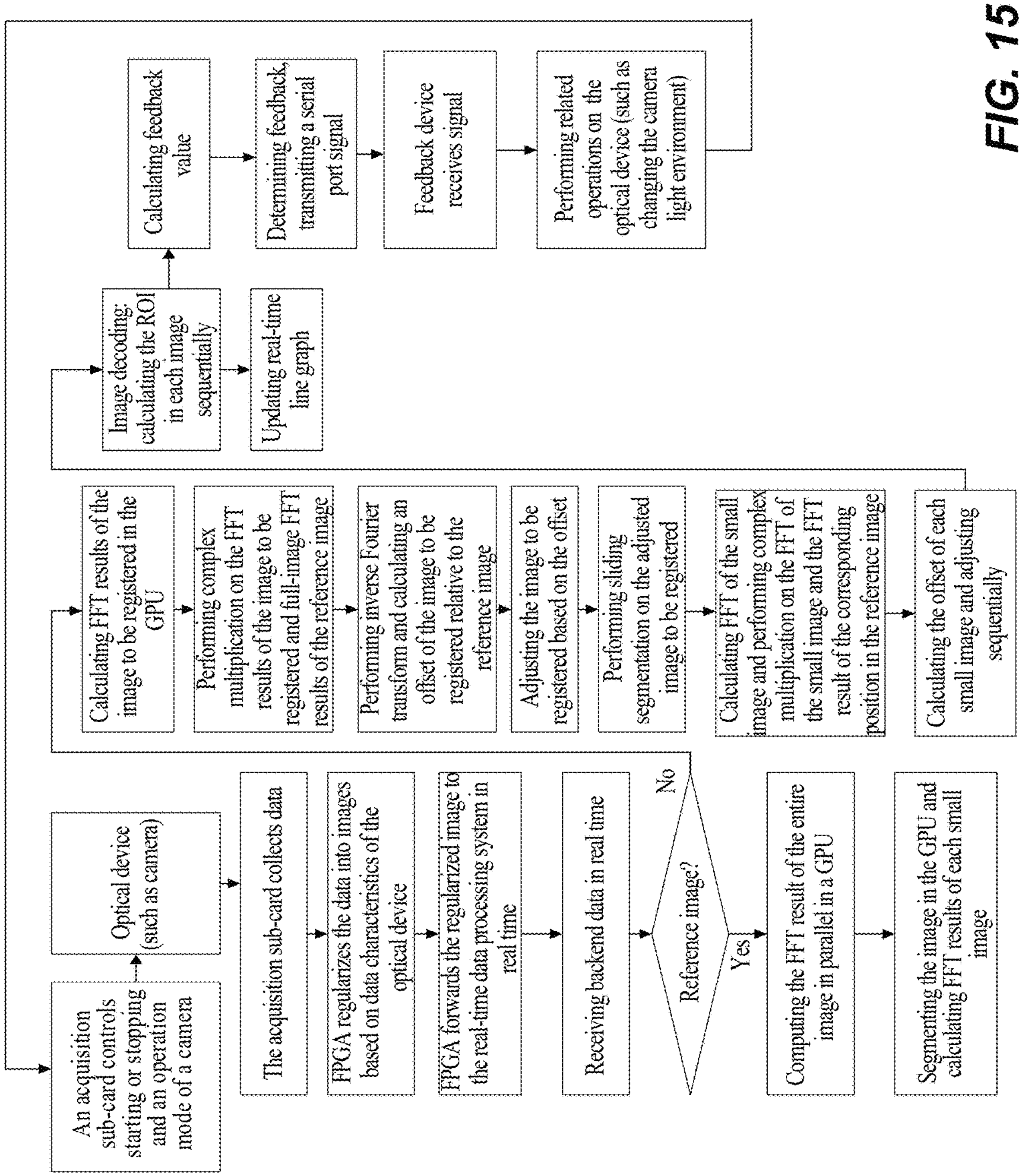
FIG. 15 is a second schematic flow chart of an optical brain-computer interface method according to the present disclosure.

FIG. 14 is a first schematic structural diagram of an optical brain-computer interface method according to the present disclosure and FIG. 15 is a second schematic flow chart of an optical brain-computer interface method according to the present disclosure. As shown in FIG. 14 and FIG. 15, the present disclosure provides an optical brain-computer interface method, including:

S1410: obtaining an optical neural signal from an optical acquisition device based on a preset interface;

S1420: preprocessing the optical neural signal to obtain first neural image data;

S1430: performing parallel registration on the first neural image data based on a preset first registration algorithm and a preset second registration algorithm, to obtain registered second neural image data;

S1440: decoding the second neural image data based on a preset region of interest to obtain representation data for neural activity; and S1450: obtaining a feedback control signal based on the representation data for neural activity for performing closed-loop feedback.

In an embodiment, preprocessing the optical neural signal to obtain the first neural image data includes:

regularizing the optical neural signal based on an operation mode of the optical acquisition device to obtain the first neural image data.

In an embodiment, the optical brain-computer interface method according to the present disclosure further includes: numbering the first neural image data.

In an embodiment, the optical brain-computer interface method according to the present disclosure further includes:

determining a control instruction based on the feedback control signal to control start-up or shutdown and an operation mode of the optical acquisition device.

In an embodiment, performing parallel registration on the first neural image data based on the preset first registration algorithm and the preset second registration algorithm to obtain the registered second neural image data includes:

preprocessing reference image data obtained in advance to obtain preprocessed reference image data;

performing global registration on the first neural image data based on the first registration algorithm and the preprocessed reference image data;

performing local registration on first neural image data subjected to the global registration based on the second registration algorithm and the preprocessed reference image data; and obtaining the second neural image data based on a registration result of the local registration.

In an embodiment, preprocessing the reference image data obtained in advance to obtain the preprocessed reference image data includes:

performing global preprocessing on the reference image data based on the first registration algorithm;

performing local preprocessing on the reference image data based on the second registration algorithm; and obtaining the preprocessed reference image data based on a result of the global preprocessing and a result of the local preprocessing.

In an embodiment, the optical brain-computer interface method according to the present disclosure further includes:

obtaining the first neural image data based on a preset polling drive mode.

In an embodiment, decoding the second neural image data based on the preset region of interest to obtain the representation data for neural activity includes:

determining regions of interest in the second neural image data based on the preset region of interest; and calculating a value and a trend of change of each of the regions of interest in the second neural image data to obtain the representation data for neural activity.

In an embodiment, the optical brain-computer interface method according to the present disclosure further includes:

storing the first neural image data and the second neural image data separately.

In the optical brain-computer interface system and method provided by the present disclosure, the underlying optical neural signal is directly obtained from the optical acquisition device through an interface, without need for the data acquisition software equipped by manufacturers. Tracking steps such as preprocessing, registration, decoding, etc., can be performed in real time on the underlying optical neural signal and the feedback control signal can be also obtained based on the decoded representation data for neural activity for performing closed-loop feedback.

Through the description of the embodiments above, those skilled in the art can clearly understand that the various embodiments can be implemented by way of software and a necessary general hardware platform, and, of course, by hardware. Based on such understanding, the solutions of the present disclosure in essence or a part of the solutions that contributes to the prior art, or a part of the solutions, may be embodied in the form of a software product, which may be stored in a storage medium such as ROM/RAM, magnetic discs, optical discs, etc., and includes several instructions to cause a computer device (which may be a personal computer, server, or network device, etc.) to perform the methods described in various embodiments or a part thereof.

It should be noted that the above embodiments are only used to explain the solutions of the present disclosure, and are not limited thereto; although the present disclosure has been described in detail with reference to the foregoing embodiments, it should be understood by those skilled in the art that modifications to the solutions documented in the foregoing embodiments and equivalent substitutions to a part of the features may be made and these modifications and substitutions do not make the essence of the corresponding solutions depart from the scope of the solutions of various embodiments of the present disclosure.

What is claimed is:

1. An optical brain-computer interface system, comprising:

an acquisition configured to obtain an optical neural signal from an optical acquisition device based on a preset interface;

a preprocessing unit configured to preprocess the optical neural signal to obtain first neural image data, wherein the first neural image data comprises at least one layer of image data;

a registration unit configured to perform parallel registration on the first neural image data based on a preset first registration algorithm and a preset second registration algorithm to obtain registered second neural image data;

a decoding unit configured to decode the second neural image data based on a preset region of interest to obtain representation data for neural activity; and a feedback unit configured to obtain a feedback control signal based on the representation data for neural activity for performing closed-loop feedback.

2. The optical brain-computer interface system of claim 1, wherein the preprocessing unit is further configured to regularize the optical neural signal based on an operation mode of the optical acquisition device to obtain the first neural image data.

3. The optical brain-computer interface system of claim 1, wherein the preprocessing unit is further configured to number the first neural image data.

4. The optical brain-computer interface system of claim 1, wherein the preprocessing unit is further configured to control start-up or shutdown and an operation mode of the optical acquisition device.

5. The optical brain-computer interface system of claim 1, wherein the registration unit is further configured to:

preprocess reference image data obtained in advance to obtain preprocessed reference image data;

perform global registration on the first neural image data based on the first registration algorithm and the preprocessed reference image data;

perform local registration on first neural image data subjected to the global registration based on the preset second registration algorithm and the preprocessed reference image data; and obtain the second neural image data based on a registration result of the local registration.

6. The optical brain-computer interface system of claim 5, wherein the registration unit is further configured to preprocess the reference image data obtained in advance to obtain the preprocessed reference image data by:

performing global preprocessing on the reference image data based on the first registration algorithm;

performing local preprocessing on the reference image data based on the preset second registration algorithm; and obtaining the preprocessed reference image data based on a result of the global preprocessing and a result of the local preprocessing.

7. The optical brain-computer interface system of claim 1, wherein the registration unit is further configured to obtain the first neural image data based on a preset polling drive mode.

8. The optical brain-computer interface system of claim 1, wherein the decoding unit is further configured to decode the second neural image data based on the preset region of interest to obtain the representation data for neural activity by:

determining regions of interest in the second neural image data based on the preset region of interest; and calculating a value and a trend of change of each of the regions of interest in the second neural image data to obtain the representation data for neural activity.

9. The optical brain-computer interface system of claim 1, further comprising:

a storage unit configured to store the first neural image data and the second neural image data separately.

10. An optical brain-computer interface method, comprising:

obtaining an optical neural signal from an optical acquisition device based on a preset interface;

preprocessing the optical neural signal to obtain first neural image data;

performing parallel registration on the first neural image data based on a preset first registration algorithm and a preset second registration algorithm, to obtain registered second neural image data;

decoding the second neural image data based on a preset region of interest to obtain representation data for neural activity; and obtaining a feedback control signal based on the representation data for neural activity for performing closed-loop feedback.

* * * * *